(12) United States Patent
Saito (10) Patent No.: US 9,540,019 B2
(45) Date of Patent: Jan. 10, 2017

(54) TRAIN CONTROL DEVICE

(71) Applicant: THE NIPPON SIGNAL CO., LTD., Tokyo (JP)

(72) Inventor: Keiichi Saito, Kuki (JP)

(73) Assignee: The Nippon Signal Co., LTD., Tokyo (JP)

( * ) Notice: Subject to any disclaimer, the term of this patent is extended or adjusted under 35 U.S.C. 154(b) by 86 days.

(21) Appl. No.: 14/503,019

(22) Filed: Sep. 30, 2014

(65) Prior Publication Data

US 2015/0014488 A1    Jan. 15, 2015

Related U.S. Application Data

(63) Continuation of application No. PCT/JP2013/057685, filed on Mar. 18, 2013.

(30) Foreign Application Priority Data

Mar. 30, 2012   (JP) .................................. 2012-082603

(51) Int. Cl.
*B61L 3/08* (2006.01)
*B60T 7/12* (2006.01)
(Continued)

(52) U.S. Cl.
CPC .............. *B61H 13/00* (2013.01); *B60L 3/0015* (2013.01); *B61L 3/006* (2013.01); *B61L 3/008* (2013.01);
(Continued)

(58) Field of Classification Search
CPC .............. B61L 3/00; B61L 3/002; B61L 3/006; B61L 3/008; B61L 3/02; B61L 3/08; B61L 3/16; B61L 3/18; B61L 15/00; B61L 23/00; B61L 23/08; B61L 23/14; B61L 23/16; B61L 23/18
(Continued)

(56) References Cited

U.S. PATENT DOCUMENTS 5,950,966 A * 9/1999 Hungate ................. B61L 3/125
246/167 R

FOREIGN PATENT DOCUMENTS

CN       101544237 A     9/2009
CN       102167065 A     8/2011
(Continued)

OTHER PUBLICATIONS

Chinese Office Action dated Jan. 5, 2016, which issued in Chinese Application No. 201380017880.7, together with English language translation thereof.
(Continued)

*Primary Examiner* — R. J. McCarry, Jr.
(74) *Attorney, Agent, or Firm* — McDermott Will & Emery LLP (57) ABSTRACT

The present invention relates to a train control device. The train control device sets an emergency brake pattern and a regular brake pattern as patterns of maximum speed according to the distance to a stopping point, and outputs a braking command when the train speed exceeds the maximum speed. Then, when the maximum speed defined in the regular brake pattern falls below a set speed, the maximum speed of the regular brake pattern is kept constant for a predetermined distance. After that, the maximum speed is gradually reduced toward a stopping point of the emergency brake pattern. This allows a train to make an approach to a fixed stopping position in an automatic train operation even when the fixed stopping position is located farther than a stopping point of the regular brake pattern, and excessive
(Continued)

output of an emergency braking command based on the emergency brake pattern can be reduced.

7 Claims, 6 Drawing Sheets (51) Int. Cl.
  *B61H 13/00* (2006.01)
  *B60L 3/00* (2006.01)
  *B61L 3/00* (2006.01)
  *B61L 3/12* (2006.01)
  *B61L 25/02* (2006.01)
  *B61L 27/00* (2006.01)

(52) U.S. Cl.
  CPC .............. *B61L 3/121* (2013.01); *B61L 25/025* (2013.01); *B61L 27/0038* (2013.01); *B60L 2200/26* (2013.01); *B60L 2240/12* (2013.01)

(58) Field of Classification Search
  USPC ................ 246/167 R, 167 D, 182 A, 182 B, 182 C, 246/184, 186
  See application file for complete search history.

(56) References Cited

FOREIGN PATENT DOCUMENTS

| | | |
|---|---|---|
| CN | 102325684 A | 1/2012 |
| DE | 2626617 A1 | 12/1977 |
| DE | 10245149 A1 | 4/2004 |
| JP | 2002-125305 A | 4/2002 |
| JP | 2002-302040 A | 10/2002 |
| JP | 2002-315115 A | 10/2002 |
| JP | 2006-006030 A | 1/2006 |
| JP | 2006-136041 A | 5/2006 |
| JP | 2006-256352 A | 9/2006 |
| JP | 2007-037294 A | 2/2007 |
| JP | 2008-253035 A | 10/2008 |
| JP | 2009-023555 A | 2/2009 |
| JP | 2010-004662 A | 1/2010 |
| JP | 2010-036803 A | 2/2010 |
| JP | 2011-073632 A | 4/2011 |
| TW | 200628335 | 8/2006 |

OTHER PUBLICATIONS

Taiwanese Office Action dated Dec. 15, 2015, which issued in Taiwanese Application No. 102111303, together with English language translation thereof.
Extended European Search Report dated Jan. 29, 2016, which issued in European Application No. 13768599.6.
Japanese Office Action dated Sep. 8, 2015, which issued in Japanese Application No. 2012-082603, and English language translation thereof.
International Preliminary Report on Patentability (IPRP) dated Oct. 9, 2014, which issued in International Application No. PCT/JP2013/057685, and English language translation.

* cited by examiner

TRAIN CONTROL DEVICE

CROSS-REFERENCE TO RELATED APPLICATION

This application is a continuation application of PCT/JP2013/057685, filed on Mar. 18, 2013, which is hereby incorporated by reference in its entirety for all purposes.

BACKGROUND

1. Field

The present invention relates to a train control device that sets a pattern of maximum speed according to a distance to a stopping point, and outputs a braking command when the speed of a train exceeds the maximum speed.

2. Description of Background

Japanese Patent Application Laid-open Publication No. 2002-315115 discloses a train control device that sets two kinds of brake patterns, an emergency brake pattern and a regular brake pattern, as maximum speed patterns according to the distances to stopping points, and sets the stopping point of the regular brake pattern nearer than the stopping point of the emergency brake pattern.

Suppose that the stopping point of the regular brake pattern and the stopping point of the emergency brake pattern are located at the same position or positions close to each other. In this case, if the train speed exceeds the maximum speed of the regular brake pattern in a low-speed range near the stopping points, the probability that the train speed will exceed the maximum speed of the emergency brake pattern becomes high due to a response delay in reducing the train speed through the regular braking, and hence the emergency braking, under which the brake is not released until the train comes to a complete stop, will be being put to use with high frequency.

Suppose on the other hand that the stopping point of the regular brake pattern is set nearer than and away from the stopping point of the emergency brake pattern. In this case, even when the train speed exceeds the maximum speed of the regular brake pattern, the probability that the train speed will exceed the maximum speed of the emergency brake pattern can be reduced.

However, when a fixed stopping position (a ground coil P0 placed in a position opposite to an on-board coil when the train is at a stop) in an automatic train operation is located between the stopping point of the regular brake pattern and the stopping point of the emergency brake pattern, since the stopping point of the regular brake pattern comes nearer than the fixed stopping position, the train cannot make an approach to the fixed stopping position.

SUMMARY

The present invention has been made by focusing on the above problem, and it is an object thereof to provide a train control device capable of preventing the travel of a train from being inhibited unreasonably while suppressing excessive output of a braking command.

To this end, the train control device according to the present invention is a train control device that sets a pattern of maximum speed according to a distance to a stopping point and outputs a braking command when a train speed exceeds the maximum speed, in which the maximum speed pattern is changed in the middle of reducing the maximum speed toward the stopping point.

DETAILED DESCRIPTION

An embodiment of the present invention will be described below.

Figure 1:
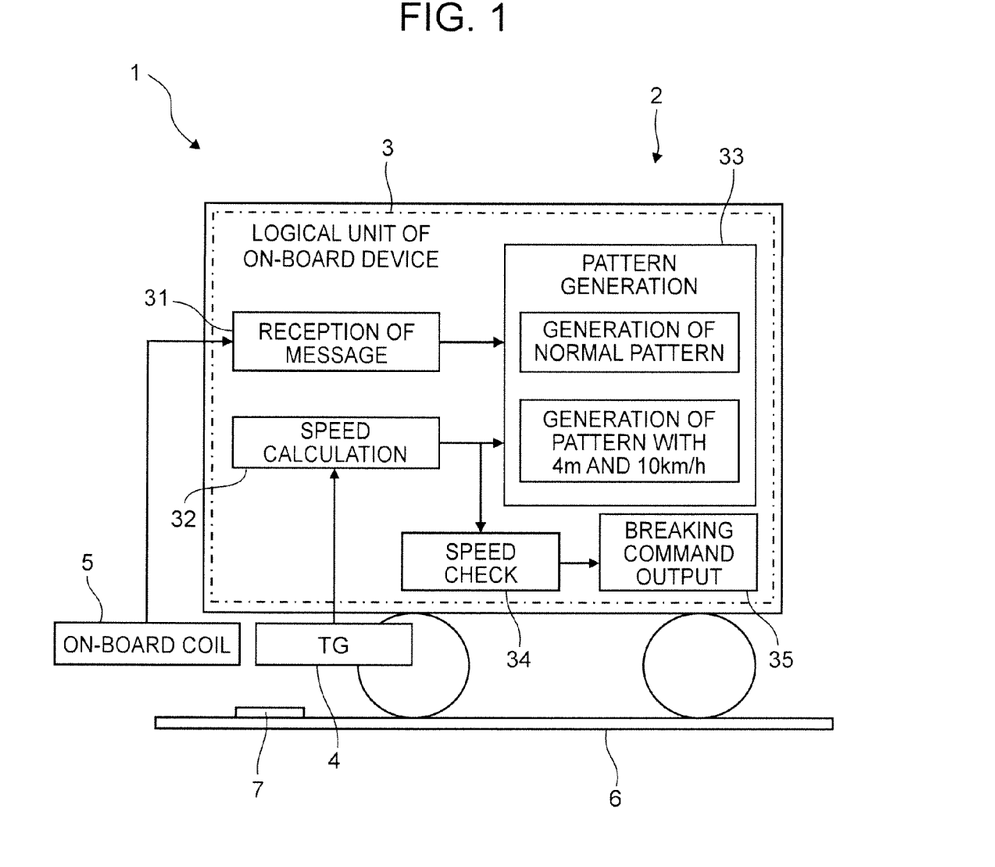
FIG. 1 is a diagram illustrating the general structure of a train control device according to an embodiment of the present invention.

FIG. 1 illustrates the structure of a train control device 1. An on-board device 3 is mounted on a train 2. This on-board device 3 has a logical unit (processing unit) configured to include a CPU to perform various kinds of control such as speed control and braking control of the train 2.

Note that the train control device 1 of the embodiment is a device with a combination of an ATC (Automatic Train Control system) or an ATP (Automatic Train Protection system) as a protection system and an ATO (Automatic Train Operation system) as a train operation device.

To the on-board device 3, a tachometer generator (TG) 4 for outputting a pulse signal along with the rotation of an axle of the train 2, an on-board coil 5 provided in a bottom part or the like of the front of the train 2 are connected.

Ground coils 7 are provided near a permanent way (a pair of rails) 6 at predetermined intervals along the running direction of the permanent way 6. The ground coils 7 are, for example, electromagnetic induction type non-power source transponder ground coils to transmit a location code indicative of the installation location of each ground coil 7 in response to a power wave from the on-board coil 5.

The on-board coil 5 receives a location code signal from the ground coil 7 and transmits the power wave to the ground coil 7 as mentioned above.

The logical unit of the on-board device 3 has the functions as a message receiving unit 31 for interpreting a signal received at the on-board coil 5, a speed calculating unit 32 for calculating the speed of the train 2 based on the pulse signal output by the tachometer generator 4, a pattern generating unit 33 for using the output of the message receiving unit 31 and the speed calculating unit 32 as input to calculate the maximum speed (brake speed) for each location of the train 2 in real time, a speed check unit 34 for continuously comparing the maximum speed set by the pattern generating unit 33 and the actual speed of the train 2 calculated by the speed calculating unit 32, and a braking command output unit 35 for outputting a braking command based on the output of the speed check unit 34.

Figure 2:
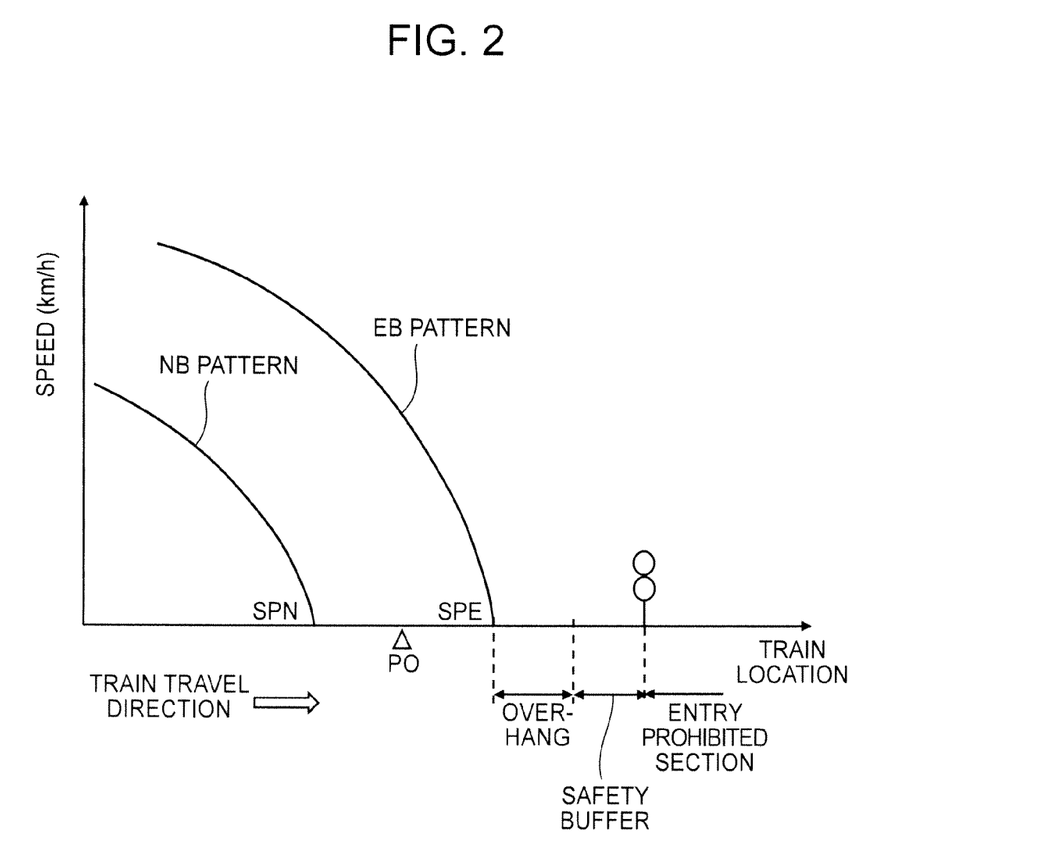
FIG. 2 is a chart illustrating an example of a regular brake pattern and an emergency brake pattern in the embodiment of the present invention.

Here, as illustrated in FIG. 2, the pattern generating unit 33 generates two kinds of patterns as the maximum speed patterns for each location of the train 2, namely an emergency brake pattern EB and a regular brake pattern NB.

The emergency brake pattern EB is such that, when the actual speed of the train exceeds the maximum speed in the pattern, a braking command is output to the train control system including a brake device, and once the braking command is output, the break is not released until the train 2 comes to a complete stop.

On the other hand, the regular brake pattern NB is such that, when the actual train speed exceeds the maximum speed in the pattern, a braking command is output to the train control system including the brake device, and when the actual train speed falls below the maximum speed, the break is released.

For example, as illustrated in FIG. 2, when a protection area of the signal is a train entry prohibited section, a command for setting a stopping point SPE to a position nearer than the signal by a safe distance, including a safety buffer and an overhang length of the train, is transmitted from the ground coil 7 to the on-board device 3.

Then, the pattern generating unit 33 of the on-board device 3 sets, as the emergency brake pattern EB, a maximum speed pattern obtained by adding a reduction rate and an idle running time to a preset emergency braking curve (for example, deceleration=4.3 km/h/s) along which the speed will become 0 km/h at the stopping point SPE from a limited speed+α (for example, α=10 km/h).

On the other hand, the pattern generating unit 33 sets a stopping point SPN in the regular brake pattern NB to a position a predetermined distance (for example, 4 m) nearer than the stopping point SPE in the emergency brake pattern EB, and sets, as the regular brake pattern NB, a pattern obtained by adding a reduction rate and an idle running time to a preset regular maximum braking curve (for example, deceleration=3.6 km/h/s) along which the speed will become 0 km/h at the stopping point SPN from a limited speed+β (for example, β=5 km/h).

Figure 3:
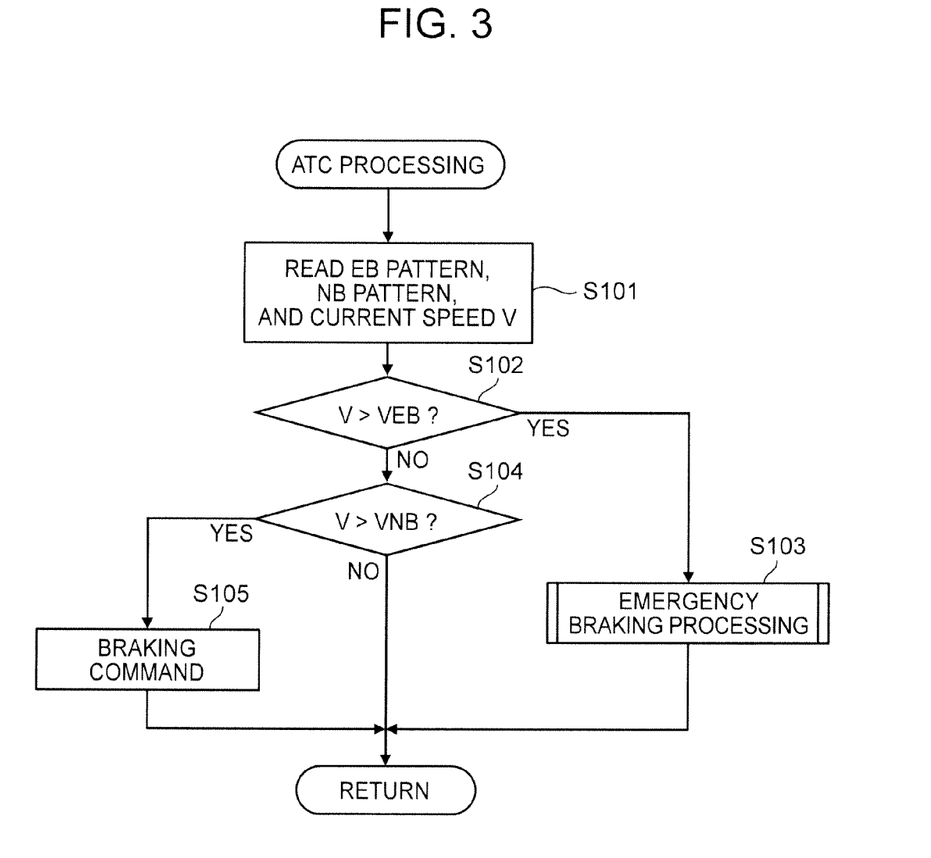
FIG. 3 is a flowchart illustrating braking control based on the regular brake pattern and the emergency brake pattern in the embodiment of the present invention.

A flowchart of FIG. 3 illustrates a flow of processing (speed check processing) performed by the speed check unit 34 and the braking command output unit 35. It is assumed that this processing illustrated in the flowchart of FIG. 3 is performed at predetermined time intervals.

First, in step S101, the emergency brake pattern EB, the regular brake pattern NB, and further a current train speed V are read.

Next, in step S102, it is determined whether the current train speed V exceeds a maximum speed VEB defined in the emergency brake pattern EB. When the current train speed V exceeds the maximum speed VEB, the procedure proceeds to emergency braking processing in step S103.

In the emergency braking processing of step S103, an emergency braking command continues to be output until the train speed V becomes zero (until the train 2 comes to a complete stop).

On the other hand, when the current train speed V falls below the maximum speed VEB, the procedure proceeds to step S104 to determine whether the current train speed V exceeds a maximum speed VNB defined in the regular brake pattern NB.

Then, when the current train speed V exceeds the maximum speed VNB defined in the regular brake pattern NB, the procedure proceeds to step S105 to output a regular braking command, while when the current train speed V falls below the maximum speed VNB defined in the regular brake pattern NB, the procedure bypasses step S105 not to output the regular braking command.

As mentioned above, the pattern generating unit 33 generates a basic pattern of the regular brake pattern NB, indicative of the maximum speed VNB at each location of the train 2, based on the stopping point SPN, the regular maximum braking curve, and the like. In this regard, the pattern generating unit 33 changes a pattern of the maximum speed VNB in regular braking in the middle of reducing the maximum speed (regular brake speed) toward the stopping point SPN. More specifically, the pattern generating unit 33 performs processing for changing the stopping point SPN.

Figure 4:
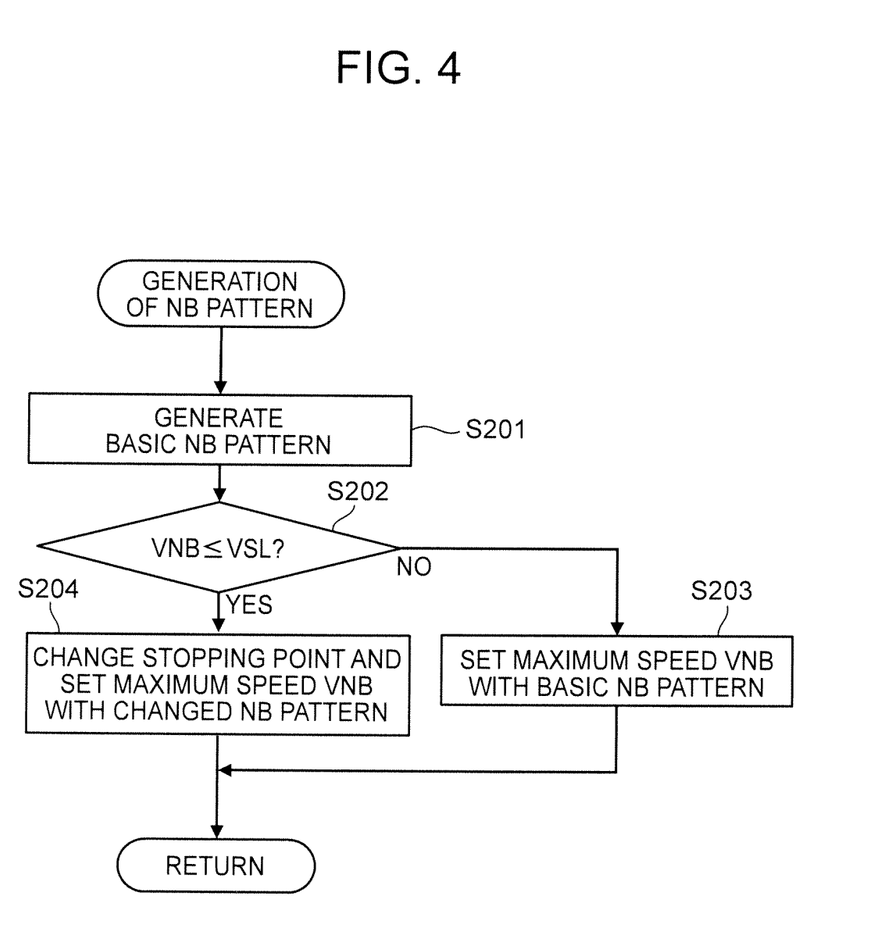
FIG. 4 is a flowchart illustrating pattern changing processing for the regular brake pattern in the embodiment of the present invention.

Pattern changing processing (stopping point changing processing) for the regular brake pattern NB in the pattern generating unit 33 will be described below with reference to a flowchart of FIG. 4. It is assumed that processing illustrated in this flowchart of FIG. 4 is performed at predetermined time intervals.

First, in step S201, a basic pattern (NB pattern illustrated in FIG. 2) as the regular brake pattern NB is generated based on the stopping point SPN set to the position the predetermined distance nearer than the stopping point SPE, the regular maximum braking curve, the reduction rate, and the idle running time.

In step S202, it is determined whether the maximum speed VNB reaches a preset, predetermined speed VSL (for example, 5 km/h to 10 km/h) in the middle of reducing the maximum speed VNB defined in the basic pattern of the regular brake pattern NB toward the stopping point SPN according to the current location of the train 2.

When the maximum speed VNB exceeds the predetermined speed VSL, the procedure proceeds to step S203 to set a maximum speed VNB used for speed check according to the basic pattern of the regular brake pattern NB set in step S201.

On the other hand, when the maximum speed VNB defined in the basic pattern of the regular brake pattern NB reaches the predetermined speed VSL, the procedure proceeds to step S204 to change the pattern of the maximum speed VNB.

Figure 5:
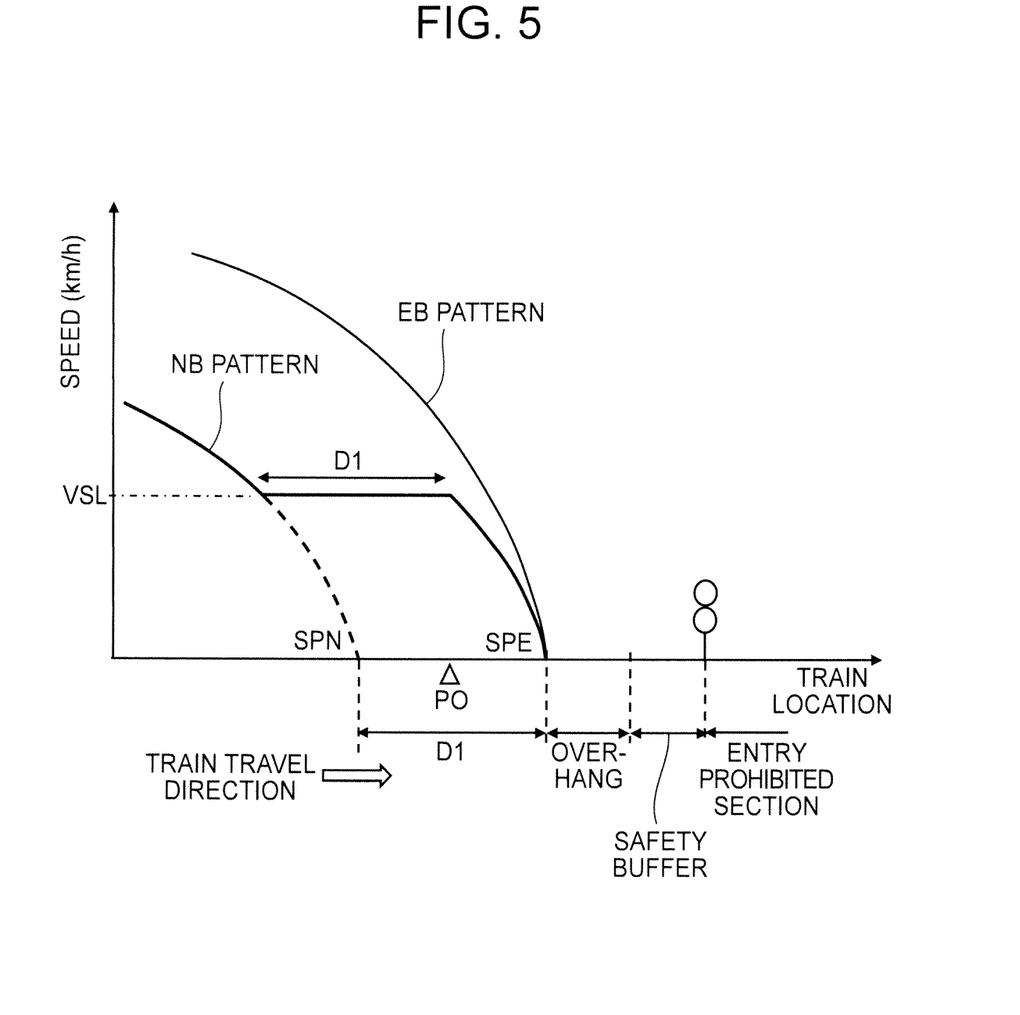
FIG. 5 is a chart for describing a change in the regular brake pattern in the embodiment of the present invention.

Specifically, as illustrated in FIG. 5, the maximum speed VNB is kept at the predetermined speed VSL for a predetermined distance D1 from a position at which the maximum speed VNB defined in the basic pattern of the regular brake pattern NB has reached the predetermined speed VSL, and after that, the maximum speed VNB is gradually reduced from the predetermined speed VSL toward the stopping point SPE of the emergency brake pattern EB along the regular maximum braking curve so that the maximum speed VNB will become zero at the stopping point SPE.

Here, the predetermined distance D1 can be set to a distance (for example, 4 m) corresponding to a distance between the stopping point SPE and the stopping point SPN.

As mentioned above, the stopping point of the regular brake pattern NB is changed from the stopping point SPN, located nearer than the stopping point SPE of the emergency brake pattern EB, to the stopping point SPE of the emergency brake pattern EB a predetermined distance farther than the stopping point SPN in the middle of reducing the maximum speed VNB defined in the basic pattern of the regular brake pattern NB toward the stopping point SPN.

Thus, for example, when the train is stopped at a fixed stopping position on a platform of a station, even when the ground coil P0 placed in a position opposite to the on-board coil 5 comes between the stopping point SPN and the stopping point SPE, such a situation that the train 2 comes to a stop by braking based on the regular brake pattern NB before the train 2 stops at the fixed stopping position, at which it is designed that the on-board coil 5 and the ground coil P0 are in positions opposite to each other, to disable the train 2 from making an approach to the fixed stopping position can be avoided.

In other words, the stopping point of the regular brake pattern NB is changed to the stopping point SPE a certain distance farther than the stopping point SPN to change the stopping point SPN located nearer than the ground coil P0 (fixed stopping position) to a point farther than the ground coil P0 (fixed stopping position). This permits the entry of the train 2 just before the stopping point SPE and hence allows the train 2 to make an approach to the fixed stopping position (on the platform of the station).

Here, the stopping point of the regular brake pattern NB can be always set identical to the stopping point SPE of the emergency brake pattern EB to allow the train 2 to make an approach to the fixed stopping position nearer than the stopping point SPE. In this case, however, the maximum speed VNB defined in the regular brake pattern NB always takes a value close to that of the maximum speed VEB defined in the emergency brake pattern EB.

When the maximum speed VNB defined in the regular brake pattern NB is close to the maximum speed VEB defined in the emergency brake pattern EB, if the speed of the train 2 exceeds the maximum speed VNB, the probability that the speed of the train 2 will go straight to exceed the maximum speed VEB of the emergency brake pattern becomes high in a high-speed range due to a braking response delay and the like, and hence the emergency braking, under which the brake is not released until the train comes to a complete stop, will be being put to use with high frequency.

In contrast to this, even when the maximum speed VNB and the maximum speed VEB become close to each other, if the speed range is a low-speed range where the maximum speed VNB falls below the predetermined speed VSL as mentioned above, the probability of emergency braking can be sufficiently reduced and the train 2 is allowed to make an approach to the fixed stopping position as mentioned above.

Note that the pattern of the maximum speed VNB after the stopping point of the regular brake pattern NB is changed from the stopping point SPN to the stopping point SPE is not limited to the feature of keeping the maximum speed VNB at the predetermined speed VSL for the predetermined distance D1.

For example, the pattern may be any pattern as long as it changes the maximum speed VNB toward the changed stopping point without increasing at least the maximum speed VNB from the time point when the maximum speed VNB becomes the predetermined speed VSL, such as to gradually reduce the maximum speed VNB toward the stopping point SPE at a constant deceleration from the time point when the maximum speed VNB becomes the predetermined speed VSL.

Further, changing the stopping point of the regular brake pattern NB is not limited to changing to the stopping point SPE. For example, a position a predetermined distance nearer than the stopping point SPE and behind which the fixed stopping position is never placed can be set as the changed stopping point, and the stopping point can be changed to a point far from the fixed stopping position and within a range not to be beyond the stopping point SPE.

A timing of changing the stopping point SPN of the regular brake pattern NB can be set to the time point when the distance to the stopping point before changed becomes the predetermined distance, or the time point when the distance to the stopping point before changed is less than the predetermined distance and the maximum speed VNB becomes less than the predetermined speed VSL. In other words, the timing of changing the stopping point (pattern) of the regular brake pattern NB may be determined based on at least either of the speed and the distance to the stopping point.

Although a case in which the stopping point SPE is set based on the location of the signal, it may be set based on the location of the preceding train. Even in this case, the stopping point SPN of the regular brake pattern NB can be changed to a farther position along the way to reduce the probability of performing emergency braking in vain without hindering the travel of the train 2 excessively.

Further, in the system for changing the stopping point of the regular brake pattern NB as mentioned above, the output of the regular braking command can be stopped even if the speed V of the train 2 exceeds the maximum speed VNB defined in the regular brake pattern NB to disable the braking control based on the regular brake pattern NB on condition that the stopping point of the regular brake pattern NB is before being changed and the distance to the fixed stopping position (ground coil P0) is input, i.e., on condition that a target speed pattern to the fixed stopping position in ATO is set.

Figure 6:
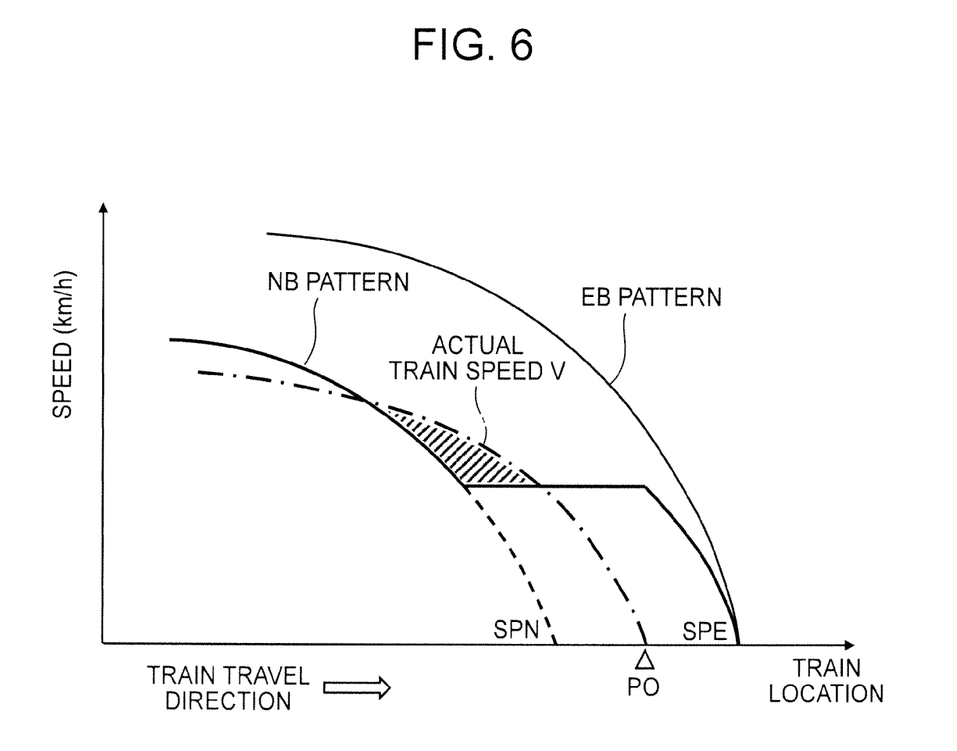
FIG. 6 is a chart illustrating a change in train speed when braking control based on the regular brake pattern in the embodiment of the present invention is disabled.

In this case, for example, since braking in a shaded area illustrated in FIG. 6 is avoided, the train 2 can travel smoothly and quickly to the fixed stopping position without being affected by the change in the stopping point (pattern) of the regular brake pattern NB. Further, since the stopping point (pattern) of the regular brake pattern NB before being changed is set as a condition, improper releasing of braking control based on the regular brake pattern NB can be avoided.

Note that, when the braking control based on the regular brake pattern NB is disabled, a warning indicating that the braking control based on the regular brake pattern NB is disabled may be displayed on a cab monitor of the train 2 and/or a monitor on the ground device side.

It should be noted that the entire contents of Japanese Patent Application No. 2012-082603, filed on Mar. 30, 2012, on which convention priority is claimed, is incorporated herein by reference.

It should also be understood that many modifications and variations of the described embodiments of the invention will be apparent to a person having an ordinary skill in the art without departing from the spirit and scope of the present invention as claimed in the appended claims.

What is claimed is:

1. A processing device mounted on a train including:
an on-board coil configured to receive, from a ground coil, information on a location of the train and information on a position of a stopping point; and
a speed sensor configured to output a signal corresponding to a speed of the train,
the processing device configured to:
set a pattern of maximum speed according to a distance to the stopping point;
output a braking command when the train speed exceeds the maximum speed;
set, as patterns of the maximum speed, an emergency brake pattern and a regular brake pattern in which a position of a stopping point is set nearer than a position of a stopping point in the emergency brake pattern; and
change the position of the stopping point in the regular brake pattern to a farther position within a range not to be beyond the position of the stopping point in the emergency brake pattern, in a middle of reducing the maximum speed of the regular brake pattern.

2. The processing device according to claim 1, further configured to detect a timing for changing the position of the stopping point in the regular brake pattern based on at least either of the distance to the stopping point, the distance to the stopping point calculated based on the information on the location of the train and the information on the position of the stopping point, which are received by the on-board coil, or the speed of the train calculated based on the signal output by the speed sensor.

3. The processing device according to claim 1, wherein:
the on-board coil is further configured to receive, from the ground coil, information on a fixed stopping position; and
when the fixed stopping position is located between the position of the stopping point in the regular brake pattern and the position of the stopping point in the emergency brake pattern, the processing device is further configured to change the position of the stopping point in the regular brake pattern to a position which is farther than the fixed stopping position and within a range not to be beyond the position of the stopping point in the emergency brake pattern, in a middle of reducing the maximum speed of the regular brake pattern.

4. The processing device according to claim 1, further configured to change the position of the stopping point in the regular brake pattern to the position of the stopping point in the emergency brake pattern, in a middle of reducing the maximum speed of the regular brake pattern.

5. The processing device according to claim 1, further configured to keep the maximum speed of the regular brake pattern constant for a predetermined distance from a time point of changing the position of the stopping point in the regular brake pattern, and after that, the processing device is further configured to gradually reduce the maximum speed toward the changed position of the stopping point.

6. The processing device according to claim 1, wherein:
the on-board coil is configured to receive, from the ground coil, information on a distance to a fixed stopping position, and
the processing device is further configured to stop output of the braking command based on the regular brake pattern when the processing device acquires the distance to the fixed stopping position and when the position of the stopping point in the regular brake pattern is before being changed.

7. The processing device according to claim 6, wherein:
the train further comprises a cab monitor, and
the processing device is further configured to display a warning on the cab monitor when the output of the braking command based on the regular brake pattern is stopped.

* * * * *